June 18, 1963 W. H. JACKSON ETAL 3,094,475
ELECTRIC POWER TRANSFER MECHANISM FOR CONVEYOR APPARATUS
Filed June 15, 1959 7 Sheets-Sheet 1

INVENTORS.
William H. Jackson,
Clement C. Piontkowski.
BY
Harness, Dickey & Pierce
ATTORNEYS.

June 18, 1963 W. H. JACKSON ETAL 3,094,475
ELECTRIC POWER TRANSFER MECHANISM FOR CONVEYOR APPARATUS
Filed June 15, 1959 7 Sheets-Sheet 4

INVENTORS.
William H. Jackson,
Clement C. Piontkowski
BY
Harness, Dickey & Pierce
ATTORNEYS.

United States Patent Office 3,094,475
Patented June 18, 1963

3,094,475
ELECTRIC POWER TRANSFER MECHANISM FOR CONVEYOR APPARATUS
William H. Jackson, Birmingham, and Clement C. Piontkowski, East Detroit, Mich., assignors to The Udylite Corporation, Detroit, Mich., a corporation of Delaware
Filed June 15, 1959, Ser. No. 820,329
8 Claims. (Cl. 204—202)

This invention relates to work conveying apparatus and more particularly to improvements in conveying apparatus of the type used in electroplating operations wherein articles are automatically conveyed through a series of treating receptacles.

In present day practice, modern production methods require maximum operating flexibility in the handling of work carriers supporting varied types of parts to be electroplated. It has been suggested that increased flexibility is achieved by providing independent elevating means at each plating station in lieu of the widely used multi-station elevator which simultaneously elevates a plurality of work carriages to be transferred. When the independent elevating means is electrically actuated, it is necessary to provide a source of power, conventionally A.C., to each of the elevating means at each work station. The use of continuous contact rails to supply such power to each plating location creates a safety hazard arising from inadvertent contact with the continuous contact rail. Shielding of the contact rail to provide adequate protection to operating personnel is impractical due to the interference therewith by conventional contacting means on the work carriages moving from station to station.

It is, therefore, the primary object of this invention to provide electrical contact means which are de-energized during the period the work carriages are being transferred along the supporting rail, thereby minimizing the hazard to operating personnel and insuring safe operation.

Another object of this invention is to provide at each treating station an improved electrical contact means of simple design and efficient operation which may be selectively energized and de-energized in accordance with a predetermined treating sequence, thereby individually controlling the elevating means of each of the work carriages.

Still another object of this invention is to provide control means whereby the elevating motor means of each work carriage is selectively de-energized at pre-selected treating stations, effecting a treating cycle deviating from the normal programmed treating sequence.

It is desirable in machines of the general type herein described to provide means for removing selected work carriages at predetermined points along their path of travel to permit their diversion through an alternate treating sequence, or to enable the repair of a work carriage in the event of component failure. Accordingly, it is still another object of this invention to provide an improved conveying machine having a rail section laterally movable with respect to the supporting rail whereby work carriages supported thereon may be removed from the normal treating sequence and diverted through an alternate treating sequence.

Another object of this invention is to provide an auxiliary rail section adapted to fit contiguously in the gap created in the supporting rail when the laterally movable rail section is in its projected position and whereby the continuity of the principal supporting rail is maintained, to thereby permit uninterrupted transport of the conveyor carriages.

Other objects and advantages of the present invention will become apparent from the following detailed description taken in conjunction with the accompanying drawings, wherein:

FIG. 5 is a side elevation view of the work carriage shown in FIG. 2;

FIG. 6 is a fragmentary horizontal sectional view of the contacting means shown in FIG. 2 and taken along line 6—6 thereof;

FIG. 12 is a wiring diagram of the electrical circuit for each of the work carriages.

Figure 1:
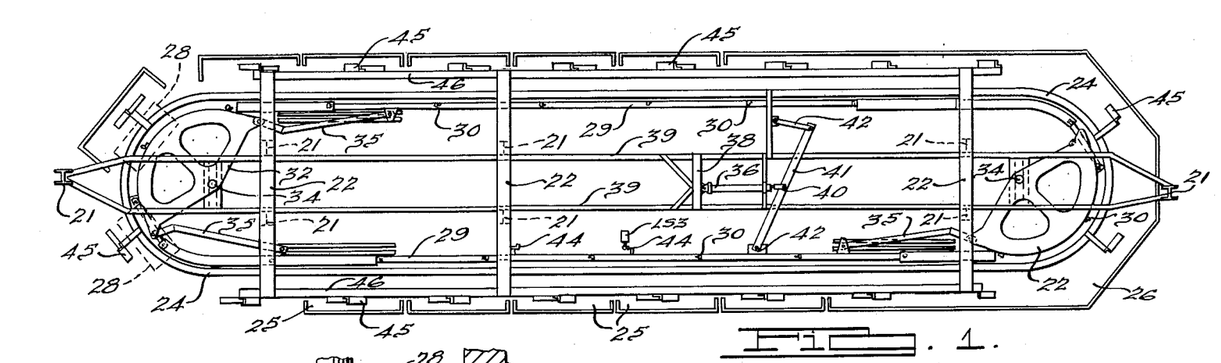
FIGURE 1 is a plan view of the plating machine incorporating the improved electric power transfer means of this invention.

With reference to the drawings, and as may best be seen in FIG. 1, a conveying machine embodying the principles of this invention is comprised of a central frame having columns 21 mounted on a base frame (not shown) and having cross-beams 22 secured to the upper ends thereof. An overhead supporting track or rail 24 having two straight side portions joined at their ends by arcuate turnaround portions is rigidly secured to cross-beams 22. Disposed below the supporting rail 24 are a plurality of treating receptacles, such as single station receptacles 25 and multiple station receptacles 26, in which workpieces carried by work carriers movably mounted on supporting rail 24 are sequentially immersed. The work carriers 28 are intermittently moved along supporting rail 24, through successive treating receptacles by means of a work transfer system comprising pusher bars 29 slidably supported on cross-beams 22 at positions inwardly of the straight portions of supporting rail 24. Pushers 30 are pivotally mounted at spaced intervals along the pusher bar 29 and are adapted to engage arms 31 (FIG. 5), attached to the work carriages 28. Turn-around transfer means are provided at each end of the machine to move the work carriers along the arcuate end portions of the supporting rail 24. The turn-around means at each end of the machine as shown in FIG. 1 is comprised of a sector plate 32 adapted to rotate on a vertical shaft 34 secured to the central frame and is drivingly linked to pusher bars 29 by means of link arms 35. Pushers 30 pivotally mounted on the periphery of sector plates 32 are adapted to engage work carriages and propel them along the arcuate rail sections at the ends of the machine.

The pusher bars and turn-around means are caused to reciprocate between an extended and retracted position by means of a double acting hydraulic transfer cylinder 36 pivotally mounted at its closed end to cross member 38 which is secured to longitudinal frame members 39 of the central frame. A clevis type fitting 40 mounted at the end of the piston rod of transfer cylinder 36 is pivotally connected to lever arm 41 which is pivotally secured at one of its ends to the central frame by means of link 42 and at the other end to pusher bar 29 by means of an ear 42 rigidly secured to the pusher bar. In this manner, the reciprocating travel of the piston rod of transfer cylinder 36 is transferred to pusher bar 29 which in turn is transmitted to the turn-around means and opposite pusher bar by link arms 35. Limit switch LS3 stationarily mounted on the central frame is contacted by actuator 44 rigidly secured to pusher bar 29 when the said pusher bars are in either the fully retracted or fully extended positions. It is the function of limit switch LS3 to control the reciprocating travel of the work transfer mechanism in accordance with the central control system which will be subsequently described in detail.

Located at each treating station and positioned outwardly and longitudinally of the supporting rail 24 are contactors 45 stationarily secured to longitudinal member 46 along the straight side portions of the machine and to the upper surface of supporting rail 24 along the arcuate turn-around portions of the machine. Electrical contactors 45 are adapted to supply electrical energy to the elevating mechanism of the work carriages at each treating station.

Figure 2:
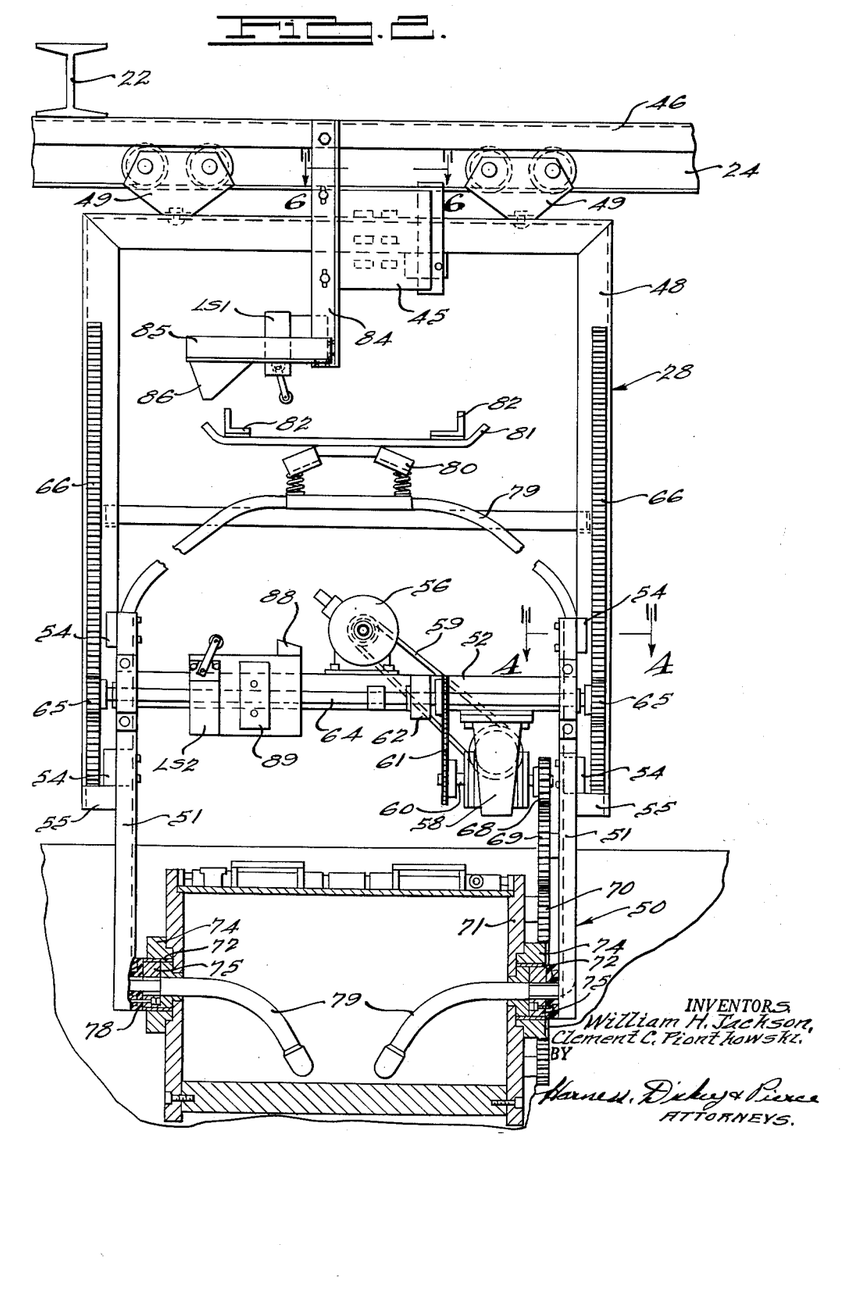
FIG. 2 is an enlarged elevation view of a single station portion of the conveying machine and a work carriage suspended from the supporting rail.
Figure 4:
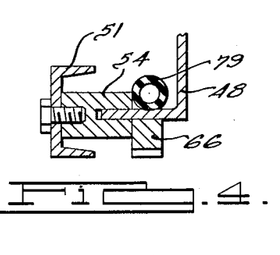
FIG. 4 is an enlarged horizontal sectional view through the frame portion of the work carriage shown in FIG. 2 and taken along line 4—4 thereof.

A typical work carriage assembly, as shown in FIG. 2, is comprised of an upright supporting frame 48 of a substantially inverted U-shape having roller assemblies 49 coacting with supporting rail 24 and pivotally secured to the horizontal portion of the supporting frame 48. A hanger frame 50 is mounted on the supporting frame 48 and includes upright side members 51 each of which has a channel-shaped cross section and which are connected intermediate their ends by a cross member 52. Guide blocks 54 mounted on each side member 51 have slots therein which are adapted to slidably engage a flange depending from upright supporting frame 48, as may be best seen in FIG. 4. This arrangement provides guided sliding support of the hanger frame 50 on the supporting frame 48 during its vertical travel relative thereto. A pair of stop blocks 55 rigidly secured to the lower ends of supporting frame 48 are adapted to engage lower guide blocks 54 mounted on the hanger frame 50 thereby limiting the downward travel of the hanger frame.

A three-phase reversible electric motor 56 mounted on the cross member 52 is drivingly linked by flexible belt 59 to gear reduction unit 58, secured to the lower portion of cross member 52. The gear reduction unit 58 has an output shaft 60 that is connected at one end to a sprocket chain 61 that drives an over-running clutch 62 mounted on shaft 64 which is rotatably supported on hanger frame 50 and is substantially parallel to cross member 52. The shaft 64 is provided at its ends with pinions 65 which mesh with racks 66 rigidly secured to the upright portions of supporting frame 48. The opposite end of the output shaft 60 of gear reduction unit 58 carries a pinion 68 which meshes with idler gear 69 rotatably attached to one side frame member 51. Idler gear 69 drives a gear 70 which is mounted on barrel container 71 rotatably supported on the lower ends of side frame members 51. It can thus be seen that the reversible motor 46 is operable to drive both the over-running clutch 62 to raise the hanger frame 50 and to rotate the barrel container 71 whereby workpieces inserted in the container are caused to be tumbled at each treating station.

Figure 3:
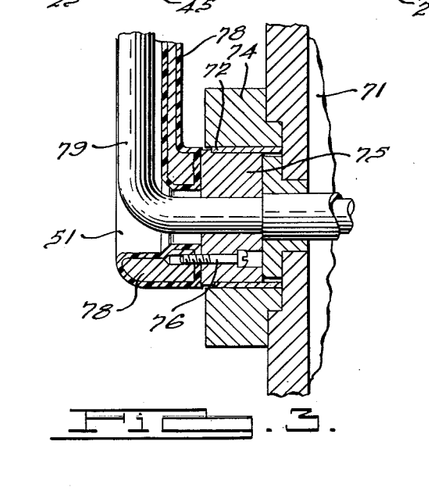
FIG. 3 is a fragmentary enlarged sectional view of one end of the barrel mounting structure shown in FIG. 2.

As may be best seen in FIG. 3, each barrel container 71 is provided with a bearing 72 at each end comprised of a low friction material, such as Teflon, and supported around its periphery by retainer ring 74 secured to barrel container 71. Bearing 72 extends around annular supporting member 75 which is secured to side member 51 by screws 76. Side member 51 is provided with insulation 78 to electrically insulate barrel container 71 from hanger frame 50. Conductors 79 extend through annular bearing blocks 72 into the interior of barrel container 71 contacting the workpieces contained therein and functioning as a cathode for electroplating operation. The upper ends of conductors 79 are connected to a contact shoe 80 resiliently mounted on rearward extending members 83 connected to the supporting frame 48 as shown in FIGS. 2 and 3. As specified work stations of the conveying machine, at which a source of current is desired, a cathode bar 81 is mounted and secured to the central frame by transverse members 82 and disposed in a position such that contact shoe 80 will slidably engage said cathode bar thereby energizing conductors 79.

As heretofore mentioned, a stationary contactor 45 is located at each treating station to supply electrical current to the reversible electric motor 56 mounted on the hanger frame 50. The contactors 45 are stationarily supported outwardly of the supporting rail 24 by means of vertical brackets 84 secured at their upper ends to longitudinal member 46. A horizontal member 85 is secured to the lower end portion of vertical bracket 84 to which up-limit switch LS1 and cam 86 depending from the lower portion thereof are secured. Attached to the horizontal cross member 52 of the hanger frame 50 and disposed directly below and in vertical alignment with limit switch LS1 is actuator 88 adapted to coact with limit switch LS1 when the hanger frame 50 is in the raised position. Similarly, up position motor stop limit switch LS2 is mounted directly below and in vertical alignment with cam 86, which cam is effective to actuate limit switch LS2 as the hanger frame approaches the raised position thereby de-energizing reversible electric motor 56. Limit switches LS1 communicate to the central control system and provide safety means assuring that all hanger frames 50 are in the raised position before the work carriages 58 are transferred along supporting rail 24 to the next treating station. A manually operated on-off switch assembly 89 is also mounted on cross member 52 adjacent the limit switch LS2 providing for manual control of the electric motor 56 on each work carriage.

The operation of the elevating means for the hanger frame 50 of each work carriage 28 is coordinated by means of the central control system with the other operating sequences of the machine. If it be assumed that the hanger frame 50 is in the raised position preparatory to lowering and in which position electric motor 56 is de-energized, the downward movement of the hanger frame is initiated by energization of motor 56 whereby the weight of the hanger frame moves pinions 65 downwardly on racks 66 at the same speed of rotation permitted by over-running clutch 62. The downward travel limit of the hanger frame 50 is determined when guide blocks 54 come in engagement with stop blocks 55 and at which time the over-running characteristics of clutch 62 enables continued rotation of motor 56 and gear reduction unit 58 whereby barrel containers 71 are continuously rotated in the lower position. At the predetermined time period the central control system reverses the direction of rotation of electric motor 56 whereby over-running clutch 62 is caused to lock-up and the hanger frame 50 is raised through the coaction between pinions 65 on racks 66. In the specific arrangement herein shown, the upward travel of the hanger frame 50 is limited when limit switch LS2 is actuated by cam 86, de-energizing motor 56. The hanger frame is maintained in the raised position by the self-locking worm wheel feature embodied in the gear reduction unit 58.

It will, of course, be appreciated by those skilled in the art that a satisfactory alternative to the use of the over-running clutch specifically shown or in addition thereto is the use of a mechanical stop means in the upper position similar to that utilized to limit the downward travel of hanger frame 50. In this case, it is necessary to provide a clutch which permits over-running in either direction, such as a centrifugal friction clutch. Such a clutch on the rotating shaft of motor 56 is adapted to slip when the hanger frame 50 engages both the upper and lower stop limit blocks without stalling the motor 56. This alternate arrangement permits the elimination of up position motor limit switch LS2 and permits continued rotation of barrel containers 71 until motor 56 is de-energized by the central control means through contactor 45. Suitable mechanical latching means is also provided to maintain hanger frame 50 in the raised position and which are disengaged when motor 56 is energized.

Disposed in opposing spaced relation to stationary contactors 45 are pick-up switches 90 rigidly secured outwardly of the upright supporting frame 48 by means of transverse bracket 91. The stationary contactors 45 and the movable pick-up switches 90 are so disposed relative to each other that the contact brushes 92 on the stationary contactors 45 cooperate with contact shoes 94 on the movable pick-up switches 90 when the work carriages 28 are in appropriate position at each treating station. As may be best seen in FIG. 6, the contact brushes 92 are comprised of a wiper clip portion 95, a back-up strip 96 and a retainer clip 98 mounted together on brush block 99 and secured to face plates 100 made of an insulating material, such as Bakelite, by means of screws 101. Copper contact shoes 94 are secured to movable pick-up switch plate 102, which is composed of an insulating material such as Bakelite, for example. A dust shield 104 is mounted on pick-up switch plate 102 vertically above contact shoes 94 to minimize extraneous matter from becoming lodged between the contacting surfaces of the brushes 92 and shoes 94. In the specific conveying machine herein described, three contacting brushes with corresponding contact shoes are employed to transmit three-phase alternating current to the electric motor 56.

Figure 7:
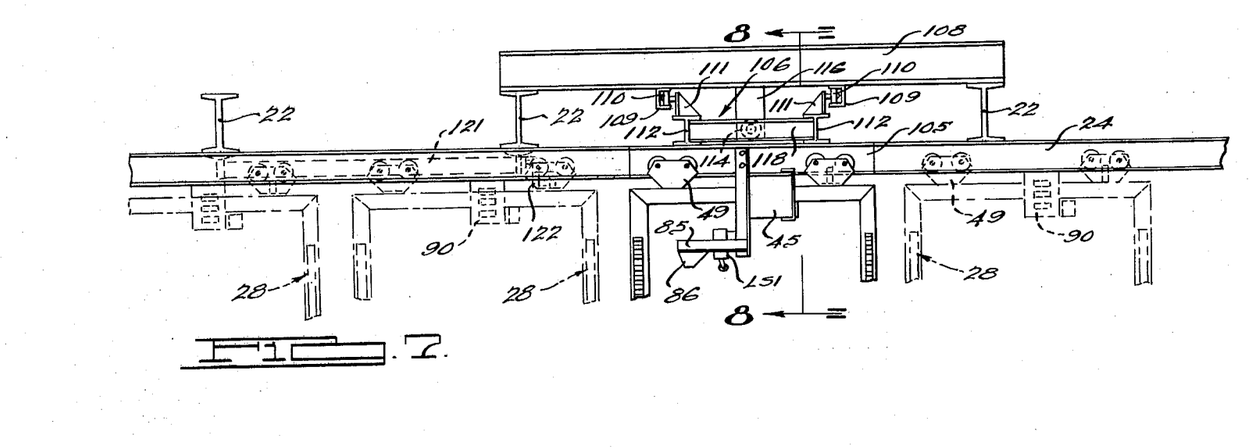
FIG. 7 is a fragmentary elevation view of the plating machine embodying a laterally movable rail section.
Figure 8:
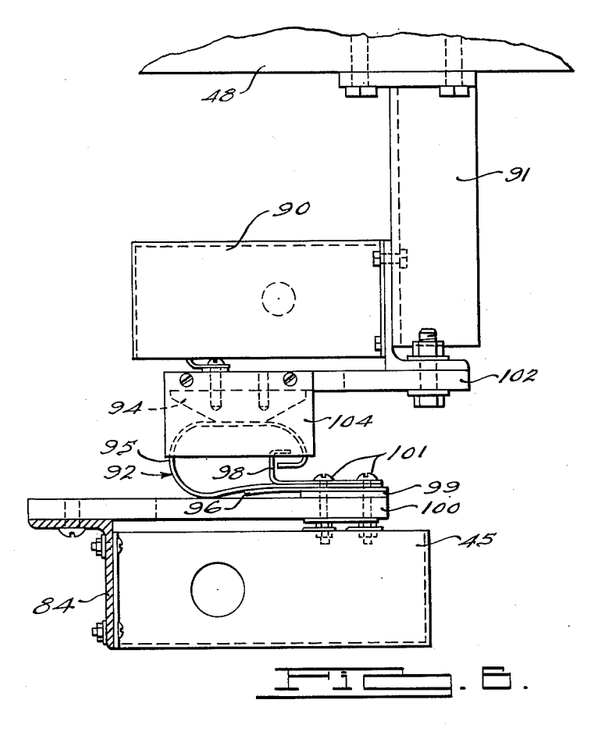
FIG. 8 is a fragmentary vertical sectional view of the laterally movable rail section shown in FIG. 7 and taken along line 8—8 thereof.
Figure 9:
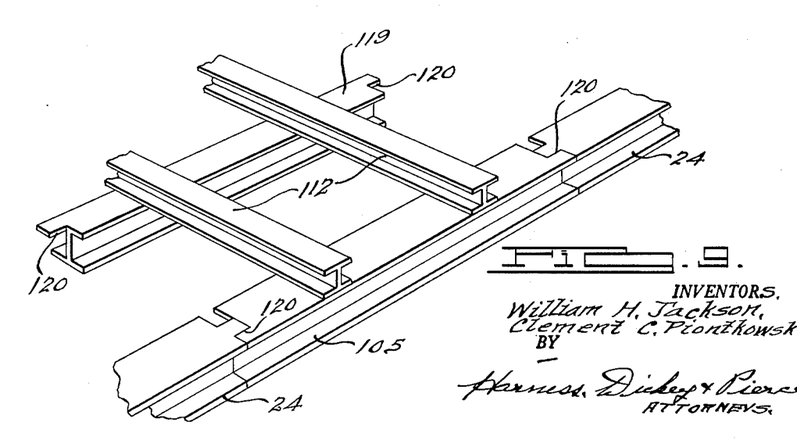
FIG. 9 is a perspective view of the interlocking provision on the laterally movable rail section and spaced work carriage supporting rail.

In machines of the general type herein described, it is often desirable to provide for laterally movable supporting rail sections whereby work carriages suspended therefrom may be diverted from the normal treating sequence of the conveying machine. As shown in FIGS. 7 through 9, the laterally movable rail section 105 is adapted to fit contiguously between spaced sections of supporting rail 24 and outwardly movable between a retracted position and a projected position. The lateral horizontal movement of rail section 105 may be achieved as shown in the drawings by means of a trundle carriage 106 supported by an overlying structure comprised of cross beams 108 spanning transverse beams 22 of the central frame. Channel guide tracks 109 are rigidly secured to the lower flanges of cross beams 108 in substantially parallel spaced-apart relation and disposed approximately perpendicular to the longitudinal center line of the machine. Coacting in guide tracks 109 are rollers 110 which are of a diameter slightly less than the width between the inner surfaces of depending flanges of channel guide tracks 109 and may accordingly bear on the upper and lower flanges providing stability of the trundle carriage 106 in spite of tilting forces to which it may be subjected. Connected to the rollers 110 are upright members 111 securely attached to the upper flanges of transverse braces 112 to the underside of which is secured the laterally movable rail 105. The trundle carriage 106 may be actuated by a double-acting hydraulic cylinder and piston rod assembly, as shown in FIG. 8, and wherein the closed end of the cylinder 114 is pivotally connected to downstanding bracket 116 secured to cross beam 108. The end of piston rod 115 is secured to cross channel member 118 of the trundle carriage whereby the reciprocating travel of the piston rod is imparted to the carriage, moving the laterally movable rail section outwardly and inwardly between the projected and retracted positions. As shown in FIG. 8, an auxiliary rail section 119 secured to transverse braces 112 disposed inwardly of and in spaced parallel relationship to the movable rail section is adapted to fit contiguously in the space between supporting rail section 24 when the movable rail section is in the projected position. The projected position of the laterally movable rail is shown in phantom in FIG. 8 and in which position auxiliary rail section 119 would occupy the position formerly occupied by movable rail section 105 and in alignment with supporting rail 24 whereby the continuity of said rail over the treating receptacles is maintained. By this arrangement, uninterrupted movement of the work carriages 28 is maintained while movable rail section 105 is in the projected position. For this reason, an auxiliary contactor 45a secured to the upper portion of auxiliary rail 119 is required to supply electrical current to the work carriages while movable rail 105 is in the projected position. Suitable interlocking means are incorporated in the upper flanges of the laterally movable rail section, auxiliary rail section and adjacent sections of the supporting rails 24 as shown in FIG. 9, whereby the rail sections are mechanically aligned with supporting rail 24. To maintain appropriate alignment and assure firm abutting contact between the interlocking means 120 along the edges of said rail sections, it is preferred to maintain a positive fluid pressure on hydraulic cylinder 114 to prevent lateral drift of the trundle carriage 106.

By means of the laterally movable rail section 105, work carriages suspended therefrom may be removed from their normal path of travel along rail 24 and workpieces carried thereby may be immersed in a receptacle adjacent to the aligned series of receptacles and disposed below said work carriage while in the projected position. Moreover, a secondary spaced supporting rail may be provided similar to the primary supporting rail 24 disposed outwardly of and in spaced parallel relationship to supporting rail 24 and positioned so that the movable rail section 105 is in alignment therewith when in the projected position. By this arrangement, workpieces supported on the laterally movable rail section may be transferred to the secondary rail through an alternate series of treating sequences and subsequently, if desired, retracted therefrom by a similar movable rail section to the primary supporting rail 24. A laterally movable rail section as herein described may also be employed as a repair station whereby work carriers having malfunctioning components may be withdrawn and repaired without interrupting the processing sequence of the conveying machine. Depending upon the specific operation and function of the laterally movable rail section, manual or automatic control means may be provided for selectively actuating hydraulic cylinder 114 in accordance with the specific treating sequence prescribed for workpieces carried by individual work carriers.

When a laterally movable rail section is employed in a conveying machine of the type herein described incorporating an auxiliary rail section such as section 119, having attached thereto an auxiliary contactor such as contactor 45a, it is necessary to provide a spaced section or gap in the pusher bar 29 adjacent to said movable rail section to provide lateral clearance for the movement of said rail section. Accordingly suitable auxiliary transfer means such as auxiliary transfer cylinder 121 disposed inwardly and longitudinally of the principal pusher bar 29 is required to transfer work carriages 28 along the supporting rail at points where the pusher bar 29 is discontinuous. The auxiliary transfer cylinder 121 is provided with an angular pusher 122 secured to the end of the piston rod and adapted to engage work arms 31 on the work carriers moving said carriages one station along the supporting rail. Actuation of the auxiliary transfer cylinder 121 is synchronized with the transfer stroke of primary transfer cylinder 36 whereby work carriages are simultaneously and uniformly moved along the supporting rail.

As heretofore mentioned, limit switch LS1 secured to horizontal bracket 85 assures that all work carriers are in the raised position before the principal and auxiliary transfer mechanism can be actuated. To provide satisfactory operation when auxiliary rail 119 equipped with auxiliary contactor 45a is employed, auxiliary limit switch LS1-a is connected in parallel with limit switch LS1 of the principal contactor 45 at that work station. Through this wiring arrangement, appropriate machine operations can be achieved when either limit switch LS1 or LS1-a is actuated by a hanger frame 50 in the raised position at that work station. When one or more work carriages are withdrawn from the supporting rail, it is necessary to provide means at the central control panel for remotely actuating up-position safety limit switches LS1 at those work stations not having a work carriage.

It is apparent that by incorporating one or more laterally movable rail sections along the supporting rail 24, the flexibility of the conveying machine herein described can be greatly increased. Additional processing flexibility can also be achieved by including special timed control features in the central control system, whereby the elevating mechanism of selected carriages can be energized or de-energized at times different than the normal operating interval. By means of these selective timer control means, the barrel containers of specific work carriages can be controlled so as to be lowered into the treating receptacle at a delayed time period or to be raised at a point in time before the remaining work carriages are raised. In this manner, a delayed immersion and an early pick-up of the workpieces can be achieved providing still further flexibility of the conveying machine. In addition to the delayed immersion and early pick-up features, it may also be desired to selectively and electrically enable and disenable the elevating means of each work carrier whereby the barrel containers are retained in the elevated position, thereby providing for a skip operation at that treating station. Variations in the processing sequence permitted by these special features are particularly desirable when succeeding work carriages contain different workpieces, each deviating slightly in their treating sequence.

Skip operation of the work carriages may be selectively achieved by means of an actuator 124, as shown in FIG. 5, connected to the longitudinal member 46 and extending inwardly toward the supporting rail 24. Limit switch LS4 slidably mounted on slide bar 125 secured to the upper portion of pick-up switch 90 may be manually or remotely positioned along said slide bar so as to be actuated by the actuator 124, as shown in phantom in FIG. 5. Accordingly, when limit switch LS4 is positioned so as to be actuable by actuator 124 at a particular work station, energization of electric motor 56 will be prevented, thereby maintaining barrel container 71 in the raised position. Limit switch LS4 may be located in the wiring circuit of the work carriage, as shown in FIG. 12, whereby it is effective when actuated to prevent energization of motor starter holding coil 126 preventing closing of starter contacts 128. It will also be appreciated by those skilled in the art that limit switch LS4 may be wired in series with a magnetic contactor disposed in the current supply lines to the brush contacts 92 whereby the contactor will be opened when limit switch LS4 is tripped by actuator 124, thereby preventing contact brushes 92 from being energized. To achieve satisfactory operation in the latter instance, the mounting positions of limit switch LS4 and actuator 124 are preferably reversed from that shown in FIG. 5. Accordingly, limit switches LS4 are stationarily mounted at each treating station and actuators 124 are slidably and adjustably mounted on each work carriage positioned so as to engage or not engage limit switches LS4. Still another alternate method of achieving satisfactory selective control of the work carriage elevating means is achieved by wiring limit switch LS4 in series with a relay contactor holding coil which is energized when switch LS4 is actuated, closing relay contactors and supplying current to the brush contacts 92. In this manner, work carriages moving into and out of a treating station may selectively energize and deenergize brushes 92 controlling the work carriage elevating means.

Figure 10:
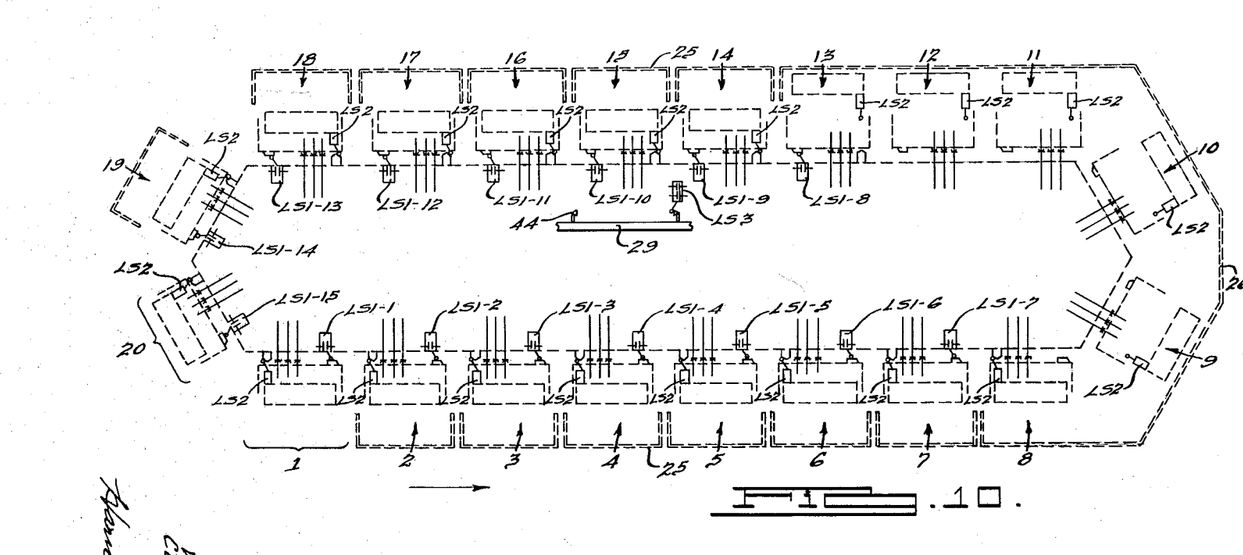
FIG. 10 is a diagrammatic plan view of the conveying machine shown in FIG. 1 and illustrating the arrangement of the limit switches and control means adjacent to each treating station.
Figure 11:
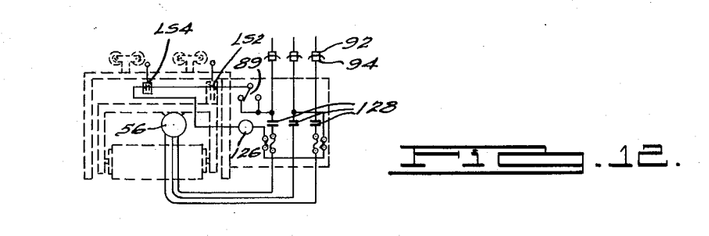
FIG. 11 is a wiring diagram of the control circuit of the conveying machine.

The operation of the machine will now be described with particular reference to FIG. 10, which is a diagrammatic view of the conveying machine shown in FIG. 1 and illustrating the relative positioning of the limit switches LS1, motor stop limit switch LS2, transfer cylinder forward and return limit switch LS3 and conducting means to supply a three-phase alternating current to the work carriage elevating means through the stationary contactors and pick-up switches at each work station. It will be noted in FIG. 10 that the machine herein described has twenty work treating stations disposed around the machine and wherein station 1 is generally utilized as a loading station and station 20 is utilized as an unloading station. Treating stations 2 through 19 are comprised of single- and multiple-station treating receptacles. The operating sequence of the conveying machine is controlled by a central control system, as shown in FIG. 11.

Let it be assumed that the pusher bars are in the forward position and the hanger frames 50 are in the raised position preparatory to being lowered into the treating receptacles below. All limit switches LS1 to LS15 have been actuated by cams 88 on the hanger frames 50, closing their contacts and transfer limit switch LS3 has been actuated, closing contacts LS3–1. Operation of the machine is initiated by closing main disconnect switch 129, whereby the circuit is energized, energizing control transformer 130. Manual push button switches 89 mounted on each work carrier controlling the elevating means thereof are closed on all work carriages which are to be used to process workpieces in the machine. Circuit start switch 131 is closed, energizing control relay CR1, which in turn closes contacts CR1–1 to lock the start switch in a closed position so that it may be released. Similarly, hydraulic motor start switch 132 is closed, energizing motor control relay CM5, which closes normally open contacts CM5–1 and motor contactor CM5–2, starting hydraulic motor 134, which in turn is drivingly linked to a suitable hydraulic pump. In order to stop the operation of the machine and the hydraulic motor, it is necessary to manually operate stop switches 131a and 132a, respectively, breaking the circuit.

In response to closing circuit start switch 131, latch relay LU1 is closed through all closed limit switches LS1–1 through LS1–15, which opens contacts LU1–2 and LU1–5 to forward transfer cylinder solenoid 135 and transfer pilot solenoid 136, stopping the principal work transfer cylinder 36 in the forward position. Simultaneously, latch relay contact LU1–3 is opened, de-energizing clutch 139 on master timer TR1, starting it to time. Master timer TR1 when de-energized and timing closes its contact TR1–1, holding in the timer motor circuit and closes contact TR1–2, thereby energizing down starter holding coil CMD1, CMD2 and delay dip timer TR2 and down rotation shut-off timer TR3. In response to energizing holding coils CMD1 and CMD2, contactors CMD1–1 and CMD2–1 are closed, energizing brushes 92 and in turn motors 56 on the work carriages, causing barrel containers 71 to be lowered and rotated. When delay dip timer TR2 times out, it closes contact TR2–1, energizing holding coil CM3, which closes contactor CM3–1, supplying current to the work carriage elevating means at station 16 whereby it is lowered. When down rotation shut-off timer TR3 times out, it opens contacts TR3–1 de-energizing holding coil CM4, which opens contactors CM4–1 stopping the supply of three-phase alternating current to work carriages located at stations 17, 18 and 19 and halting the rotation of barrel containers 71.

When timer TR1 completes its timing cycle, contact TR1–3 is opened, de-energizing starter holding coils CMD1 and CMD2 thereby opening contactors CMD1–1 and CMD2–1 and resets timers TR2 and TR3. As contact TR1–3 is opened, corresponding contact TR1–4 is closed, energizing control relay coil CR2, closing contacts CR2–3 and CR2–4, which in turn energize holding coils CM3 and CM4 which close contactors CM3–1 and CM4–1 and closing contact CR2–1. Simultaneously, contact CR2–2 is closed by holding coil CR2, energizing holding coil CMU1 which closes up starter contactor CMU1–1, causing the work carriages to be raised up out of the treating receptacles. It will be noted that barrel containers at stations 8 through 12 are maintained in the lowered position while in the multiple station treating receptacle. Master timer TR1 also opens its contact TR1–1 de-energizing its timer motor.

When the barrel containers suspended from the hanger frames 50 attain the elevated position, limit switches LS1–1 through LS1–15 are actuated and with contacts LU1–1, LU1–4 and CR2–1 closed, transfer return solenoid 137 and transfer pilot solenoid 136 are energized, retracting main transfer cylinder 36 and pusher bars 29 whereby actuator 44 trips transfer limit switch LS3 when in the retracted position, thereby opening its contact LS3–1 and closing contact LS3–2. When contact LS3–2 is closed, latch relay LU1 is energized and contact LU1–3 closes, de-energizing clutch 139 of master timer TR1 and resetting it. At the same time, contacts LU1–2 and LU1–5 are closed, energizing forward transfer solenoid 135 and pilot transfer solenoid 136, causing the transfer cylinder 36 to be actuated toward the forward position whereby work carriages are transported along the supporting rail to the next treating station. During this period, latch relay contacts LU1–1 and LU1–4 are open and when the transfer cylinder and pusher rod attain their forward position tripping transfer limit switch LS3 in the forward position, latch relay LU1 latches and the cycle hereinbefore described is repeated.

As has been heretofore mentioned, three-phase electric current applied to the brushes 92 and transmitted to the contact shoes 94 at each of the work stations as shown in FIGURE 11 are connected to electric motor 56 in accordance with the wiring diagram shown in FIGURE 12.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a conveyor the combination comprising a frame, a support track mounted on said frame, first electrical contact means stationarily mounted on said frame and spaced from said track, a work carrier on said support track and movable therealong, second electrical contact means on said carrier, motor means on said work carrier electrically connected to said second contact means for raising and lowering workpieces supported on said carrier, said work carrier being movable along said track between positions in which said first and said second contacts are electrically connected and electrically disconnected, means electrically connected to said first contact means and operable to supply power thereto when said second contact is electrically connected to said first contact means and to remove power from said first contact when said second contact is electrically disconnected therefrom.

2. In a conveyor the combination comprising a frame, a support track mounted on said frame, power supplying means stationarily positioned adjacent to said track and laterally spaced therefrom, a work carrier on said track and movable thereon, pusher means adjacent to said track for moving said work carrier on said track, electrical contact means on said work carrier, motor means on said work carrier electrically connected to said contact means for raising and lowering workpieces supported on said carrier, means on said pusher means operative in response to movement thereof to connect said power supplying means to a power source when said electrical contact means and said power supplying means are in contact and operative to disconnect said power supplying means from said power source when said power supplying means and said contact means are out of contact.

3. In an electroplating apparatus the combination comprising a support track, power supply means stationarily supported adjacent to said track, a work carrier supported from and adapted to be moved along said track to a plating position and away from said plating position, means for moving said carrier along said track, a power source, switch means connecting said power source and said power supply means, electrical contact means on said carrier adapted to contact said power supply means when said carrier is in said plating position, motor means on said work carrier electrically connected to said contact means for raising and lowering workpieces supported on said work carrier, means on said carrier operable to actuate said switch means to electrically connect said power source and said power supply means responsive to the motion of said work carrier into said plating position and operable to electrically disconnect said power source and said power supply means responsive to the motion of said work carrier away from said plating position.

4. An electroplating apparatus comprising a frame, a support track mounted on said frame, a plurality of first contact means stationarily attached adjacent to said track, each said first contact means spaced laterally from and along said track and each said first contact means defining a plating location, a plurality of work carriers on said track and movable to and from said plating locations, each said work carrier having second electrical contact means attached thereto and disposed to engage said first contact means when said carrier is in a plating location, motor means on said work carrier electrically connected to said second contact means thereon for raising and lowering workpieces supported on said work carrier, power supply means operable to supply power to said first contact means when said second contact means is in engagement therewith and to disconnect power to said first contact when said second contact means is out of engagement therewith.

5. An electroplating apparatus as claimed in claim 4 wherein each said work carrier is provided with means actuating said power supply means responsive to the movement of said work carrier into and out of said plating location.

6. An electroplating apparatus as claimed in claim 5 wherein said actuating means on said work carrier is presettable to a position in which said power supply means is selectively actuated.

7. An electroplating apparatus as claimed in claim 5 wherein reciprocating means are supported on said frame, disposed adjacent to said track and adapted to move said work carriers therealong, and said power supply actuating means are mounted on said reciprocating means and are operable responsive to reciprocation thereof.

8. An electroplating apparatus comprising in combination a frame, a support track mounted on said frame and having at least one section of said trackway removable therefrom, support means disposed transversely of said support track for movably supporting a removable section of said support track, a work carrier on said removable section of trackway adapted to move therealong and having a workpiece support, vertically disposed leg portions on said workpiece support, a workpiece frame member carrying power means adapted to raise and lower said frame member on the said leg portions of said support, electrical contact means integral with said removable track and spaced therefrom, means on said work carrier contacting said electrical contact means to thereby supply power to said power means, means secured to said support means for horizontally moving said section between a projected position out of alignment with said support track and a retracted position in alignment with said support track, an auxiliary track section substantially coextensive in length with said removable section mounted on said traverse support means and laterally spaced therefrom, electrical contact means integral with said auxiliary track and spaced therefrom, said auxiliary track adapted to occupy the position in said support track vacated by said removable section when said removable section is in its said projected position to thereby complete the same and enable a second said work carrier to move on said auxiliary track and by engagement with said electrical contact means on said auxiliary track to supply power to said power means on said second work carrier.

References Cited in the file of this patent

UNITED STATES PATENTS

| | | |
|---|---|---|
| 1,115,671 | Herrmann | Nov. 3, 1914 |
| 2,709,010 | Todd | May 24, 1955 |
| 2,716,415 | Davis | Aug. 30, 1955 |
| 2,732,962 | Bullard | Jan. 31, 1956 |
| 2,738,321 | Finston | Mar. 13, 1956 |
| 2,789,569 | Davis | Apr. 23, 1957 |
| 2,854,159 | Abbey | Sept. 30, 1958 |
| 2,887,447 | Lancy | May 19, 1959 |
| 2,894,078 | Harkins | July 7, 1959 |
| 2,905,665 | Borodin | Sept. 22, 1959 |
| 2,979,181 | Abbey | Apr. 11, 1961 |
| 3,022,881 | Harper et al. | Feb. 27, 1962 |